(12) United States Patent
Krasutsky et al.

(10) Patent No.: US 7,857,872 B2
(45) Date of Patent: Dec. 28, 2010

(54) CO-PRODUCTION OF BIODIESEL AND AN ENRICHED FOOD PRODUCT FROM DISTILLERS GRAINS

(75) Inventors: Pavel A. Krasutsky, Duluth, MN (US); Andriy B. Khotkevych, Duluth, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 1036 days.

(21) Appl. No.: 11/585,364

(22) Filed: Oct. 23, 2006

(65) Prior Publication Data

US 2007/0089356 A1      Apr. 26, 2007

Related U.S. Application Data

(60) Provisional application No. 60/728,893, filed on Oct. 21, 2005.

(51) Int. Cl.
C10L 5/00 (2006.01)
C11B 1/00 (2006.01)

(52) U.S. Cl. .................. 44/605; 426/417; 426/482; 554/8; 554/9

(58) Field of Classification Search .................. 44/605; 426/417, 482; 554/8
See application file for complete search history.

(56) References Cited

U.S. PATENT DOCUMENTS

| 5,520,708 A * | 5/1996 | Johnson et al. ............. 44/388 |
| 5,707,673 A | 1/1998 | Prevost et al. |
| 7,481,890 B2 | 1/2009 | Cheryan |
| 2004/0087808 A1 * | 5/2004 | Prevost et al. ............. 554/9 |
| 2005/0220951 A1 | 10/2005 | Abbas et al. |
| 2006/0019360 A1 | 1/2006 | Verser et al. |
| 2006/0041152 A1 | 2/2006 | Cantrell et al. |
| 2008/0045730 A1 | 2/2008 | Deline et al. |
| 2008/0176298 A1 | 7/2008 | Randhava et al. |

FOREIGN PATENT DOCUMENTS

| CN | 1743440 A1 | 3/2006 |
| WO | WO-2008/039859 A2 | 4/2008 |

OTHER PUBLICATIONS

Singh, et al., "Extraction of Oil from Corn Distillers Dried Grains with Solubles", 1998, Transactions of the ASAE, Bol. 41(6), pp. 1175 and 1176.*

Yokoyama, et al. "Liquid Fuel Production from Ethanol Fermentation Stillage" 1986, The Chemical Society of Japan, pp. 649-652.*

(Continued)

*Primary Examiner*—Deborah D Carr
(74) *Attorney, Agent, or Firm*—Schwegman, Lundberg & Woessner, P.A.

(57) ABSTRACT

Embodiments of the present invention relate to a method for the production of biodiesel and co-production of an enriched food product. The method comprises the steps of extracting with solvent from distillers grains sufficient to produce an extract and an enriched food product, separating the oil from the extract, reacting the oil sufficient to produce biodiesel, and refining the biodiesel.

7 Claims, 4 Drawing Sheets

OTHER PUBLICATIONS

"The Matchmaker", *Biodiesel Magazine*, [online]. Retrieved from the Internet: <http://www.biodieselmagazine.com/article.jsp?article_id=1248>, (Nov. 2006), 3 pgs.

Chien, J. T., et al., "Oil Extraction of Dried Ground Corn With Ethanol", *Chemical Engineering Journal*, 43(3), (1990), B103-B113.

Kalman, G., et al., "Consecutive Aqueous Extractions of Wet-Milled Corn Germ Cake", *Chemical and Biochemical Engineering Quarterly*, 22(2), (2008), 221-226.

Kwiatkowski, J. R., et al., "Extraction of Oil from Ground Corn Using Ethanol", *JACOS*, 79(8), (Aug. 2002), 825-830.

Kwiatkowski, J. R., et al., "Recovery of Corn Oil from Ethanol Extracts of Ground Corn Using Membrane Technology", *Journal of the American Oil Chemists' Society*, 82(3), (2005), 221-227.

Moreau, R. A., et al., "The Composition of Corn Oil Obtained by the Alcohol Extraction Ground Corn", *JAOCS, Journal of the American Chemists' Society*, 82(11), (2005), 809-815.

Luo, C., et al., "New Extraction Processing of Oil and Protein from Corn", *Zhongguo Youzhi*, 22(6), (1997), 17-18.

Luo,, C., et al., "New extraction processing of oil and protein from corn", *Chemical Abstracts*, 128(16), (1998), p. 445.

\* cited by examiner

CO-PRODUCTION OF BIODIESEL AND AN ENRICHED FOOD PRODUCT FROM DISTILLERS GRAINS

PRIORITY OF INVENTION

This non-provisional application claims the benefit of priority under 35 U.S.C. §119(e) to U.S. Provisional Patent Application Ser. No. 60/728,893, filed Oct. 21, 2005, which is herein incorporated by reference.

FIELD OF TECHNOLOGY

The embodiments of the present invention relate to the production of biodiesel. Further, the embodiments relate to the co-production of biodiesel and an enriched food product from distillers grains.

BACKGROUND

The development and incentives for the use of renewable energy is a key component of many governmental political strategies. Americans alone consume more than 20 million barrels of oil a day. Currently, the United States imports more than two thirds of the oil it utilizes. Ethanol manufacturing from corn is a subject of great interest at many levels of government. The main drawback of modern ethanol technologies is the neglect of additional value-added products that can be successfully produced parallel to ethanol manufacturing. One of the typical by-products, dried distillers grains and solubles (DDGS), may be sold as animal feed, but is not usually considered an economically viable by-product as its nutritional quality and price is not competitive with conventional soybean feed in many parts of the country. The DDGS also has a short shelf life, making it difficult to market as a feed product. Another undesirable consequence of biofuel production is the air pollution associated with the drying of distillers grains. Most conventional processes use a hot stream of air to dry the distillers grains, which is then vented to the atmosphere causing bad odors near the facility.

Biodiesel refers to mono alkyl esters of long chain fatty acids derived from vegetable oils or animal fats. Biodiesel is a promising alternative fuel source suitable as a diesel fuel or diesel fuel lubricity additive because it is biodegradable, non-toxic and has low emission profiles as compared to conventional fuels. However, high raw material and processing costs have limited the widespread use of biodiesel.

The most common method of producing biodiesel is the base-catalyzed transesterification (or alcoholysis) of triglycerides, such as vegetable oils and animal fats. The transesterification reaction involves reacting the triglyceride with an alcohol to form fatty acid esters and glycerol. The reaction is sequential wherein the triglycerides are reduced to diglycerides, monoglycerides and then to glycerol with ester liberated at each step.

SUMMARY

The embodiments of the present invention provide for the production of biodiesel from a by-product of a biofuel production process, such as the production of ethanol. Distillers grains are produced as a by-product of the biofuel production process and are typically sold as a cheap feed for livestock. The embodiments of the present invention use distillers grains to produce biodiesel and also co-produce an enriched food product. The biodiesel can then be sold as an alternative fuel source and the resulting enriched food product can be sold as an animal feed or a human food source at a higher price than the typical distillers grains. Because the oil and fat in the distillers grains have been substantially removed and converted to biodiesel, the remaining food product is enriched in proteins and carbohydrates and is more suitable for storage and processing.

Embodiments of the present invention relate to a method for production of biodiesel and co-production of an enriched food product. The method comprises the steps of extracting with solvent from distillers grains sufficient to produce an extract and an enriched food product, separating the oil from the extract, reacting the oil sufficient to produce biodiesel, and refining the biodiesel. Embodiments also relate to the drying of wet distillers grains.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. Reference numbers are the same for those elements that are the same across different Figures. In the drawings.

DETAILED DESCRIPTION OF THE EMBODIMENTS OF THE PRESENT INVENTION

Figure 1:
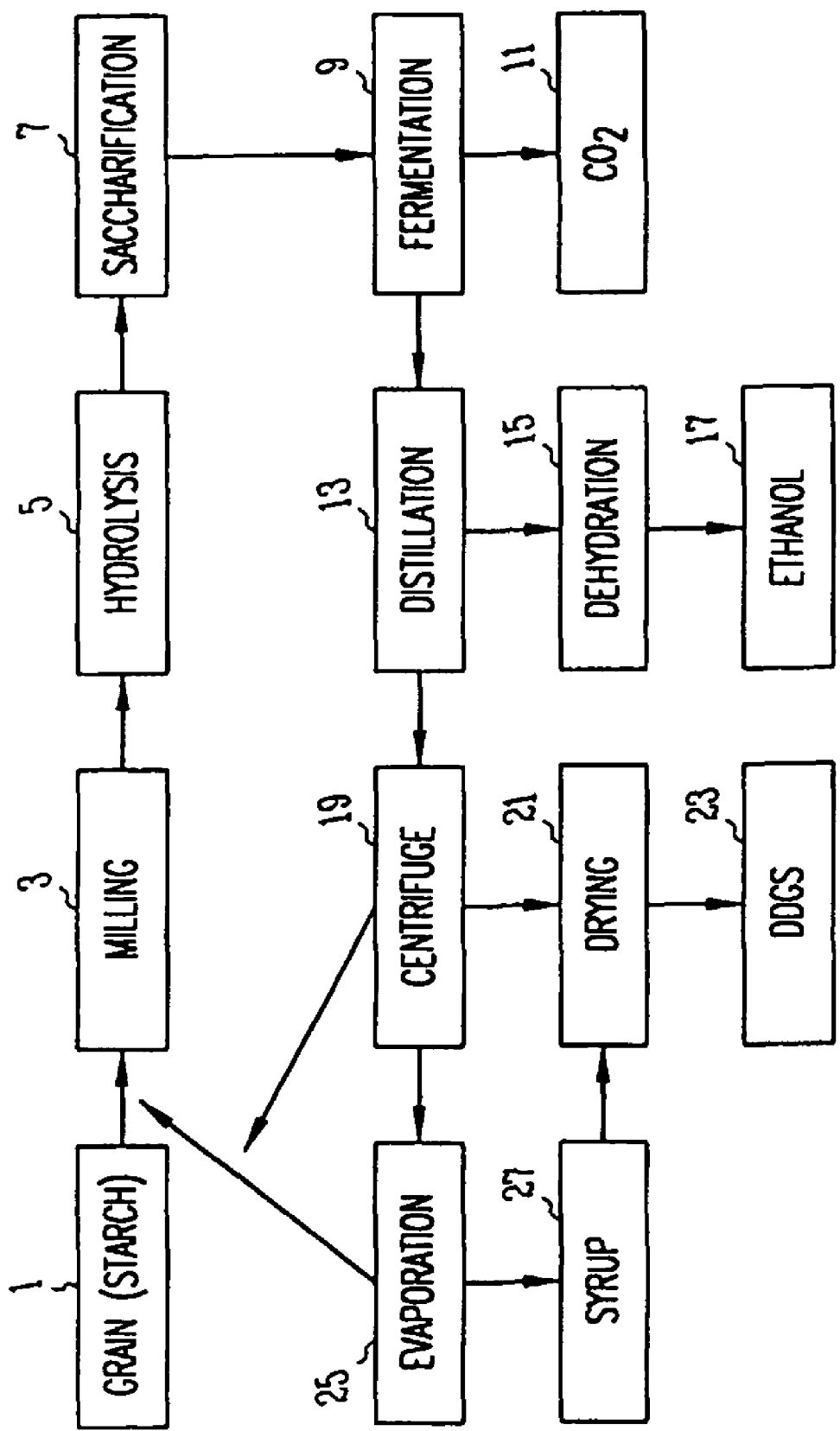
FIG. 1 illustrates a block diagram of a Dry Mill process to produce ethanol.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The embodiments of the present invention relate to novel methods of production of biodiesel from distillers grains. When describing the apparatus and methods, the following terms have the following meanings, unless otherwise indicated.

DEFINITIONS

As used herein, "whole stillage" refers to the residual slurry left after distillation in a biofuel production process. Whole stillage may contain the insoluble and soluble non-starch components from the feed grains, as well as any yeast grown during fermentation. A feed grain may be corn, as an example.

As used herein, "thin stillage" refers to the product remaining after the wet distillers grains have been removed from the whole stillage, usually by centrifugation in a biofuel production process.

As used herein, "syrup" refers to the remainder of the thin stillage after evaporation in a biofuel production process. A syrup may contain about 30-35% solids and may be blended with wet distillers grains or used as an animal feed.

As used herein, "wet distillers grains" refers to the product obtained after the removal of ethanol by distillation from the yeast fermentation of corn.

As used herein, "dried distillers grains and solubles (DDGS)" refers to the product obtained after the removal of ethanol by distillation from the yeast fermentation of grains or grain mixture by condensing and drying at least ¾ of the solids by the methods employed in the grain distilling industry.

As used herein, "extract" refers to the solubles from the distillers grains and ethanol.

As used herein, "extracting" refers to obtaining from a substance by chemical or mechanical action, as by pressure, distillation, or evaporation, for example.

As used herein, "concentrate" refers to the thin extract without the ethanol. The concentrate may contain oil and molasses among other minor components derived from the original distillers grains.

As used herein, "biodiesel" refers to mono alkyl esters of long chain fatty acids derived from vegetable oils or animal fats that meets the requirements of ASTM D6751-02.

As used herein, "evaporating" refers to converting or changing to a vapor.

As used herein, "refining" refers to reducing to a fine, unmixed, or pure state or to separate from extraneous matter or cleanse from impurities. Biodiesel may be refined to remove glycerol or impurities, for example.

As used herein, "separating" refers to removing a component from a mixture or combination, or to isolate.

As used herein, "filter" refers to a porous material through which a liquid or gas is passed in order to separate the fluid from suspended particulate matter. Filtering refers to the process of separating a component from a mixture or combination.

As used herein, "reacting" refers to undergoing a chemical change.

As used herein, "oil" refers to any of numerous mineral, vegetable, and synthetic substances and animal and vegetable fats that are generally slippery, combustible, viscous, liquid or liquefiable at room temperatures, soluble in various organic solvents such as ether but not in water, and used in a great variety of products, especially lubricants and fuels.

As used herein, "enriched food product" refers to a food product that is more nutritionally or economically valuable than the traditional food product in comparison. An enriched food product may be substantially without oil or fat. An enriched food product may contain less than 20% oil, less than 10% oil, less than 5% oil or less than 1% oil by weight, for example.

Referring to FIG. 1, a block diagram of a typical Dry Mill process for producing ethanol is shown. The figure illustrates an example of a process used in the biofuel industry. A feed grain (1) is milled (3) to sufficient fineness to allow water to access all the starch inside the grain. The meal is then slurried with warm water to a concentration which balances maximum take up without creating excessive viscosities downstream. The slurry temperature is then raised to accelerate the hydrolysis (5) of the grains' starch into solution. The dissolved starch is then enzymatically converted to sugars by saccharification (7) at a reduced temperature. The slurry is then further cooled to a fermentation (9) temperature and held in a tank for a number of hours. Fresh yeast is added at the beginning of each fermentation (9) cycle. The mixture is also agitated and may be circulated externally to remove the heat generated by the process. Carbon dioxide (11) is generated by the fermentation (9) process and may either be scrubbed for ethanol (17) or released to the atmosphere. The desired product from the fermentation (9) process is called "beer" and contains around 8-12% ethanol. The beer is pumped to a distillation (13) unit which produces about 90% ethanol with water. The stream from the distillation (13) unit is then passed through an absorber which traps the ethanol (17), while letting the water pass through. This is commonly called dehydration (15). The ethanol and water stream may be passed through multiple absorbers to produce a more pure form of ethanol (17).

The whole stillage left after distillation (13) contains all the insoluble and soluble non-starch components from the feed grain (1), as well as yeast grown during fermentation (9). The bulk of the solids, termed wet distillers grains, are removed by centrifuge (19), leaving a thin stillage. A large portion of the thin stillage may be recycled to the front of the process in order to minimize water consumption. The remainder is concentrated by evaporation (25) to recover more water to recycle. The residual syrup (27) produced by the evaporation of water contains about 30-35% solids and may be dried (21) with the wet distillers grains to produce dried distillers grains and solubles (DDGS) (23).

Figure 2:
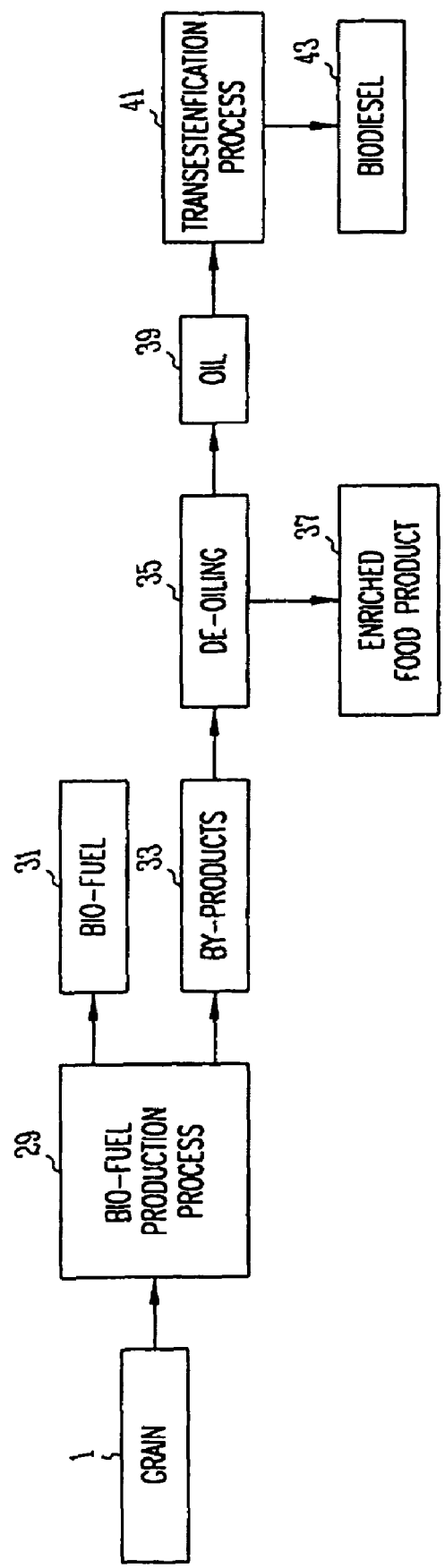
FIG. 2 illustrates a block diagram of a biofuel production process and co-production of biodiesel and an enriched food product, according to some embodiments of the invention.

Referring to FIG. 2, a biofuel production process and co-production of biodiesel and an enriched food product is shown, according to some embodiments of the invention. A grain source (1) is processed in a biofuel production process (29) to produce a biofuel (31) and by-products (33). The by-products (33) may undergo a de-oiling process (35) to give an enriched food product (37) and oil (39). The oil (39) may then be reacted via transesterification (41) to produce biodiesel (43).

Figure 3:
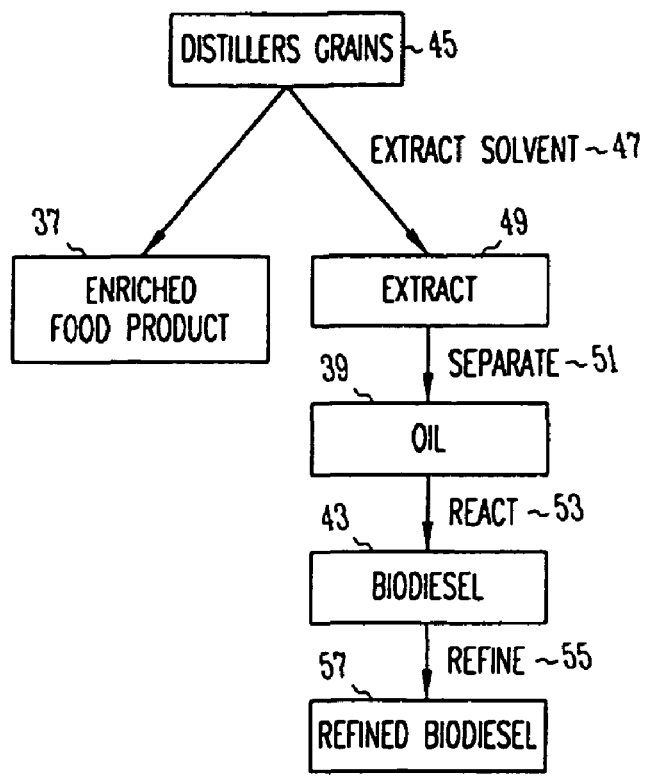
FIG. 3 illustrates a block flow diagram of a process for co-production of biodiesel and an enriched food product from distillers grains, according to some embodiments of the invention.

Referring to FIG. 3, a process for production of biodiesel from distillers grains is shown, according to some embodiments of the invention. Distillers grains (45), from a biofuel production process (29), may be extracted with a solvent (47), giving an extract (49) and an enriched food product (37). The extract (49) may then be separated (51) to isolate oil (39). The oil (39) may then be reacted (53) to produce biodiesel (43). The biodiesel (43) may be further refined (55) to produce a refined biodiesel (57).

Figure 4:
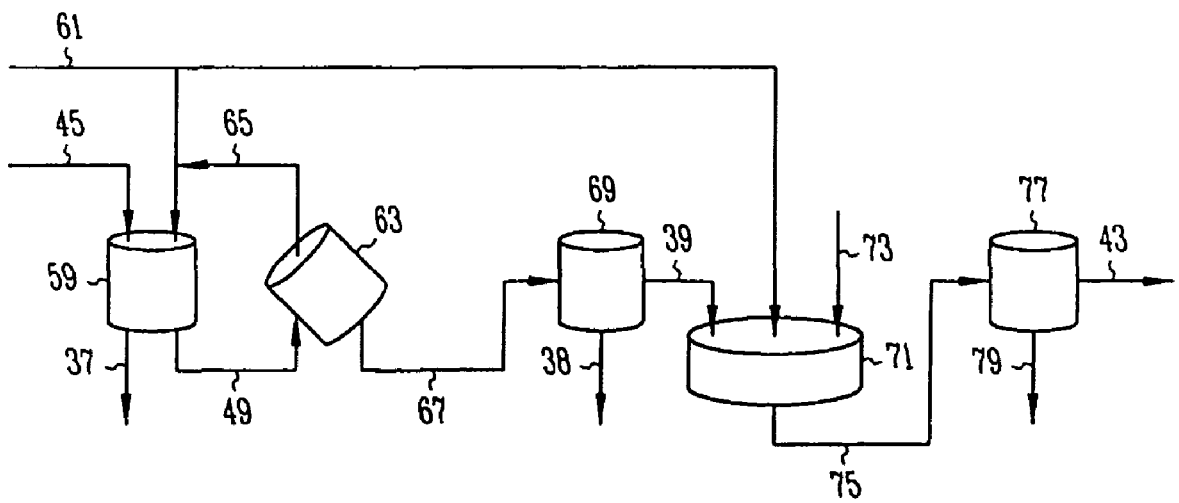
FIG. 4 illustrates a schematic for co-production of biodiesel and an enriched food product from distillers grains, according to some embodiments of the invention.

Referring to FIG. 4, a process and equipment diagram for production of biodiesel from distillers grains is shown, according to some embodiments of the invention. An ethanol feed stream (61) and distillers grains (45) may be fed into an extraction unit (59). The distillers grains (45) may be heated and extracted with ethanol in the extraction unit (59), in which an extract (49) may be filtered out and an enriched food product (37) recovered. The extract (49) may then be moved to an evaporator (63). After evaporation, ethanol may be recycled (65) to the extraction unit (59) and the concentrate (67) produced may then be transferred to a separator (69). The separator (69) may separate the top layer of oil (39) from the lower layer, which contains molasses (38) or other waste. The oil (39), ethanol feed stream (61) and catalyst (73) may be collected in the reactor (71) where the mixture undergoes transesterification. The reaction product (75) may then be transferred to a second separator (77), where the bottom layer of glycerol (79) may be disposed of. The top layer is biodiesel (43) and is collected.

Figure 5:
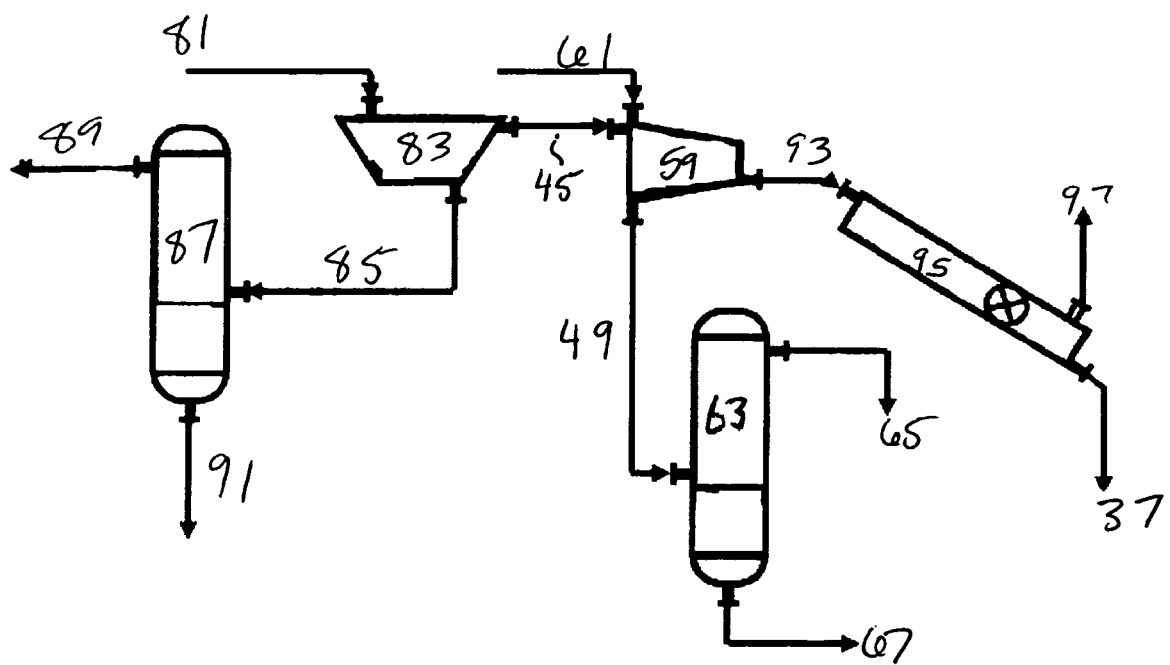
FIG. 5 illustrates a schematic for drying distillers grains, according to some embodiments of the invention.

Referring to FIG. 5, a schematic for drying distillers grains is shown, according to some embodiments of the invention. Whole stillage (81) from a biofuel process, such as in FIG. 1, may be introduced into a centrifuge (83), which separates the whole stillage (81) into wet distillers grain (45) and thin stillage (85). The thin stillage (81) may then be introduced into an evaporator (87), which separates the thin stillage (81) into water (89) and syrup (91). The wet distillers grain (45) may be introduced with an ethanol feed stream (61) to an extraction unit (59). The extraction unit (59) may then produce an extract (49) and a feed product (93). The extract (49) may then be introduced into an evaporator (63) to produce a concentrate (67) and ethanol (65) to be recycled. The feed product (93) may then be introduced into a dryer (95), which dries the feed product (93) to an enriched feed product (37) and ethanol (97) for recovery.

FIG. 1 shows a typical process to produce ethanol (17) from a grain source (1), such as corn. FIG. 1 is shown as an exemplar biofuel production process in which distillers grains (31) are produced as a by-product. Embodiments of the present invention utilize by-products from such a process and are not limited by the specific steps or equipment used in such a production process. The ethanol (17) production process utilizes the conversion of starch (1) to sugar, called saccharification (7). Ethanol is produced from the fermentation (9) of sugar. The remaining part of the grain source (1) after ethanol (17) has been removed is the focus of the present invention. Once the ethanol (17) has been distilled (13) and dehydrated (15), the whole stillage is moved to the centrifuge (19). The centrifuge (19) removes the bulk of the solids from the whole stillage, leaving wet distillers grains. Wet distillers grains may be a source for the embodiments of the present invention. Wet distillers grains may be dried with the syrup (27) from evaporation (25) of the thin stillage to produce dried distillers grains and solubles (DDGS) (23). Dried distillers grains and solubles (DDGS) (23) may be a source for the embodiments of the present invention.

Referring to FIGS. 2 and 3, process and flow diagrams describe the co-production of biodiesel and an enriched food product from distillers grains, according to some embodiments of the invention. A grain source (1), such as corn, may be subjected to a biofuel production process (29). The biofuel (31) produced may be ethanol (17) or methanol, for example. The biofuel production process (29) may also produce by-products (33), such as distillers grains (45). Distillers grains (45) may be wet distillers grains or dried distillers grains and solubles (DDGS) (23) for example. Distillers grains (45) may be extracted with a solvent (47) to produce an enriched food product (37) and an extract (49). The solvent may be ethanol (17), for example. The extract (49) may be further separated (51) of oil (39). The separation of oil (39) from the distillers grains (45) may be termed the de-oiling process (35). The oil (39) may then undergo a reaction (53), such as transesterification (41), to produce biodiesel (43). The biodiesel (43) may be refined (55) to produce a refined biodiesel (57). The refinement may strip the fuel of any contaminants, unreacted materials, or unwanted products, such as ethanol (17) or glycerol.

The enriched food product (37) that is co-produced from the distillers grains (45) may be further filtered and dried to produce a more refined and storable food product. The enriched food (37) retains such desired nutritional components as protein and carbohydrates while being separated of unwanted fats and oil (39). Further, undesirable organics may also be removed, such as those compounds that may cause the feed to have an undesirable smell. In addition, the extraction of the food product allows for a longer shelf-life in storing the food product as the absence of water and trace alcohols inhibits bacterial growth. The enriched food product (37) may also gain formulation advantages, such as the ability to be powdered to flour for use as a food or feed ingredient. The enriched food product (37) may be suitable for human as well as animal consumption. The enriched food product (37) may be especially valuable as a food source for human or poultry consumption, as neither benefits from excess fat or oil in food products.

Referring to FIG. 4, a process for co-production of biodiesel and an enriched food product from distillers grains is shown, according to some embodiments of the invention. FIG. 4 is shown as an example of a process and equipment utilizing the embodiments of the present invention. Distillers grains (45) may be fed into an extraction unit (59). The distillers grains (45) may be wet distillers grains or dried distillers grains and solubles (DDGS) (23), for example. The distillers grains (45) may be produced as a by-product of a biofuel production process (29), such as ethanol production. Further, any low weight alcohol may be used to produce biodiesel, such as ethanol, methanol, propanol, i-propanol, for example. The extraction unit (59) may be a stainless steel column or countercurrent extractor, for example. The distillers grains (45) may be extracted with ethanol. The ethanol feed stream (61) may be diverted from a biofuel production process. The distillers grains (45) and ethanol may be filtered to produce an extract (49). Further, the extraction produces an enriched food product (37) that may be collected. The enriched food product (37) contains all the nutritional properties of traditional distillers grains (45), but without the oil (39) and fat. The enriched food product (37) can also be stored for longer periods of time than dried distillers grains without deteriorating, making it a more economically viable by-product.

The extract (49) contains the soluble ingredients from the distillers grains (45) and ethanol. The extract (49) may then be transferred to an evaporator (63) where ethanol may be evaporated and recycled (65) back to the front of the process. Once the ethanol has been evaporated, the concentrate (67) that remains may be moved to a separator (69). The concentrate (67) may contain oil (39) and molasses (38), for example. The separator (69) separates the oil (39), as the top layer, from the lower layer of molasses (38) and other waste. The separator (69) may separate the oil (39) from other components by such properties as size of particle or phase of sample, for example.

The oil (39) may then be moved to a reactor (71) where it may be mixed with the ethanol feed stream (61) and a catalyst (73). The oil (39) may then be reacted (53) via transesterification (41) to produce a reaction product (75) containing biodiesel and glycerol. The catalyst (73) may be an acid or base catalyst. Further, the catalyst (73) may be sulfuric acid. The reaction (41) may be conducted by heating, stirring and refluxing for a number of hours sufficient to produce biodiesel and glycerol (79). Further, any excess ethanol (17) may be stripped from the mixture. Once the reaction product (75) has cooled, it may be transferred to a second separator (77). The second separator (77) may separate the biodiesel (43) from the glycerol (79), which may be discarded. The biodiesel (43) product may be further refined (55) of contaminants.

Example

Ten kilograms of dried distillers grains and solubles (DDGS) or 22 kilograms of wet distillers grains were extracted with ethanol in a stainless steel flanged column at 80° C. and a flow rate of 10 liters/hr. The outlet of the column was connected to a 20 L rotary evaporator to concentrate the liquor and recycle ethanol. After about six hours of extracting, the liquor (concentrate) was collected and evaporated to about six liters. It was then left to settle at ambient temperature in a separator. The top layer, about 2000 ml, was separated and then mixed with the same volume of ethanol and 10 ml of sulfuric acid. The mixture was then stirred and refluxed for over eight hours. After settling at ambient temperature in a separator, the bottom layer was separated. The top layer was evaporated on a rotary, giving 1800 ml of ethanol recovery and then distilled in vacuum, giving 1400 g of ethyl esters fraction. The product conforms to D6751-02 Standard Specification for Biodiesel Fuel (B100) Blend Stock for Distillate Fuels.

shown in FIG. 1, for example). The drying of wet distillers grains (45) of conventional processes may consume more than one third of the power used for the biofuel process. The method as described in the current figure, may significantly reduce such energy needs.

The extract (49) may then be introduced into an evaporator (63) to produce a concentrate (67) and ethanol (65) to be recycled. The concentrate (67) may then be processed into biodiesel, as shown in FIG. 4, for example. The feed product (93) may then be introduced into a dryer (95), which dries the feed product (93) from ethanol to an enriched feed product (37) and ethanol (97) for recovery. The enriched feed product (37) may include a higher protein content than feed produced by a traditional biofuel process (such as by 10% or more, for example), due to the extraction of the concentrate (which includes oil). The enriched feed product (37) will have a longer shelf life and may be more easily stored and preserved due to the reduced oil content and the presence of traces of anti-bacterial/anti-fungal ethanol.

The Abstract is provided to comply with 37 C.F.R. §1.72(b) to allow the reader to quickly ascertain the nature and gist of the technical disclosure. The Abstract is submitted with the

TABLE 1

Trial Biodiesel Samples Compared to Commercial Samples and Standards

| Trial Run # | Description | AET, ° C. | Kinematic viscosity @ 40° C., mm²/sec | Cloud Point, ° C. | Acid Number, mg KOH/g |
|---|---|---|---|---|---|
| | ASTM Norm Specified: | 360 max | 1.9-6.0 | <20 | 0.80 max |
| 1 | Ethyl esters (processed as above) | 340 | 4.5 | <20 | 0.4 |
| 2 | Ethyl esters (processed as above, repetitive) | 360 | 5.2 | <20 | 0.4 |
| 3 | Methyl esters (processed as above using methanol instead of ethanol) | 320 | 4.0 | <20 | 0.3 |
| 4 | B-100 Biodiesel (Methyl Soyate)-commercial sample | 320 | 3.6 | <10 | 0.2 |
| 5 | Ethyl Soyate (made from soybean oil using convention procedure) | 340 | 4.2 | <20 | 0.3 |

Referring to FIG. 5, a schematic for drying distillers grains is shown, according to some embodiments of the invention. Whole stillage (81) from a biofuel process, such as in FIG. 1, may be introduced into a centrifuge (83), which separates the whole stillage (81) into wet distillers grain (45) and thin stillage (85). The thin stillage (81) may then be introduced into an evaporator (87), which separates the thin stillage (81) into water (89) and syrup (91). In a traditional process, the syrup (91) may then be rerouted back to the wet distillers grains (45), so that they can be mixed and dried together using a hot air stream. The hot air stream may then be vented to the atmosphere, creating undesirable pollutants and smells.

According to the embodiments of the present invention, the wet distillers grain (45) may be introduced with an ethanol feed stream (61) to an extraction unit (59), sufficient to provide a mixture. The extraction unit (59) may then produce an extract (49) and a feed product (93) from the mixture. The ethanol feed stream (61) effectively washes the wet distillers grain (45) of water to produce the extract (49). The washing with a solvent, such as ethanol, replaces the need for using a hot air stream to dry the wet distillers grain (45) of water. Further, the drying process from ethanol according to the embodiments of the present invention uses significantly less energy and equipment as compared to a traditional process (as understanding that it will not be used to interpret or limit the scope or meaning of the claims.

What is claimed is:

1. A method for co-production of biodiesel and an enriched food product, the method comprising:
   a) subjecting a grain source to a biofuel production process, sufficient to produce a biofuel and by-products;
   b) de-oiling the by-products with ethanol extraction, sufficient to produce an oil and an enriched food product; and
   c) reacting the oil, sufficient to produce biodiesel.

2. The method of claim 1, wherein the grain source comprises corn.

3. The method of claim 1, wherein the biofuel comprises ethanol.

4. The method of claim 1, wherein the by-products comprise distillers grains.

5. The method of claim 1, wherein the distillers grains comprises wet distillers grains.

6. The method of claim 1, wherein biofuel production process is a Dry Mill Ethanol process.

7. The method of claim 1, wherein reacting the oil comprises subjecting the oil to transesterification.

* * * * *